United States Patent [19]

Hutin

[11] Patent Number: 5,084,678
[45] Date of Patent: Jan. 28, 1992

[54] METHOD AND APPARATUS FOR DETERMINING THE DIRECTION TO A METAL-CASED WELL FROM ANOTHER WELL

[75] Inventor: Rémi Hutin, Bures sur Yvette, France

[73] Assignee: Schlumberger Technology Corporation, Houston, Tex.

[21] Appl. No.: 487,687

[22] Filed: Mar. 2, 1990

[30] Foreign Application Priority Data

Mar. 17, 1989 [FR] France .................. 89 03534

[51] Int. Cl.⁵ .................. G01V 3/11; E21B 7/04; E21B 47/022
[52] U.S. Cl. .................. 324/346; 175/45
[58] Field of Search .................. 324/346; 175/45; 73/152; 33/313; 166/65 M

[56] References Cited

U.S. PATENT DOCUMENTS

| 3,488,574 | 1/1970 | Tanguy | 324/1 |
| 4,329,647 | 5/1982 | Freedman | 324/323 |
| 4,700,142 | 10/1987 | Kuckes | 324/346 |
| 4,791,373 | 12/1988 | Kuckes | 324/346 |
| 4,791,373 | 12/1988 | Kuckes | 324/346 |

Primary Examiner—Walter E. Snow
Attorney, Agent, or Firm—Henry N. Garrana; John H. Bouchard

[57] ABSTRACT

A method of locating a target well lined with metal casing, comprising the steps of lowering an electrode and a magnetic field sensor into a relief well drilled towards the target well, injecting an alternating current into the ground by means of said electrode, and detecting by means of the magnetic field sensor the magnetic field set up by the lines of current flowing between the electrode and the casing of the target well.

12 Claims, 1 Drawing Sheet

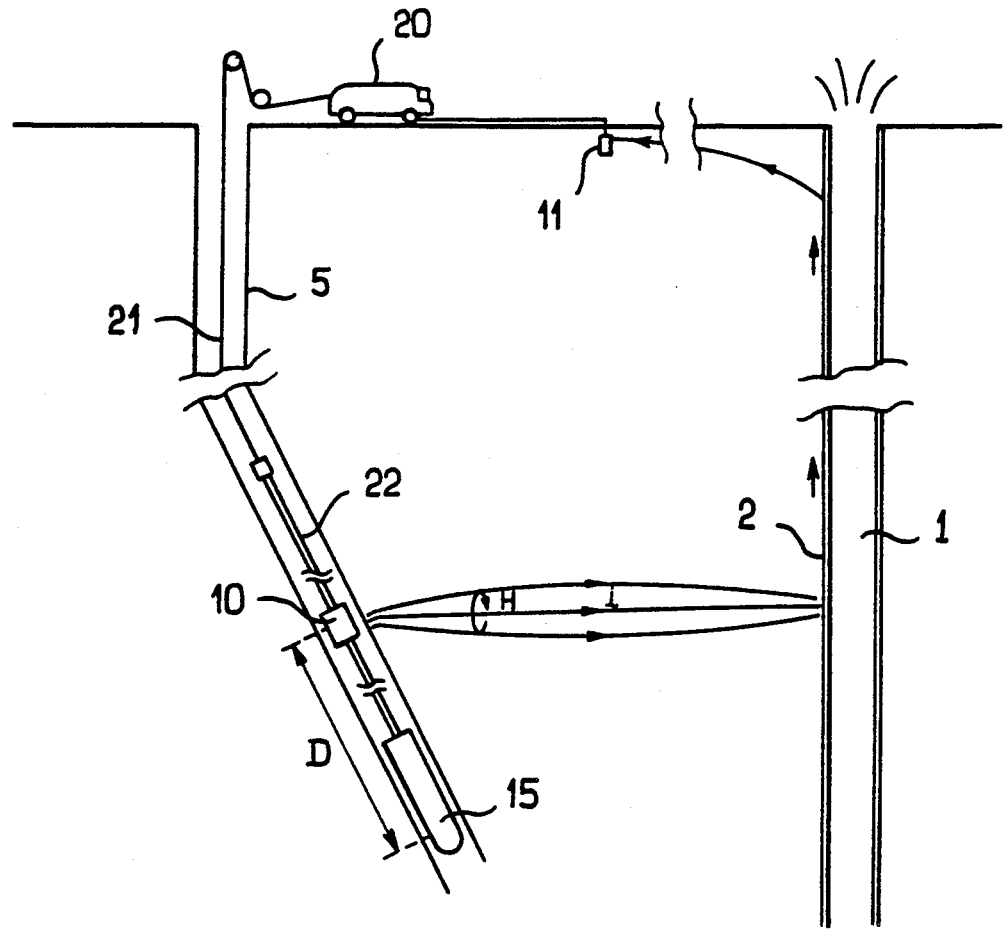
FIG_1
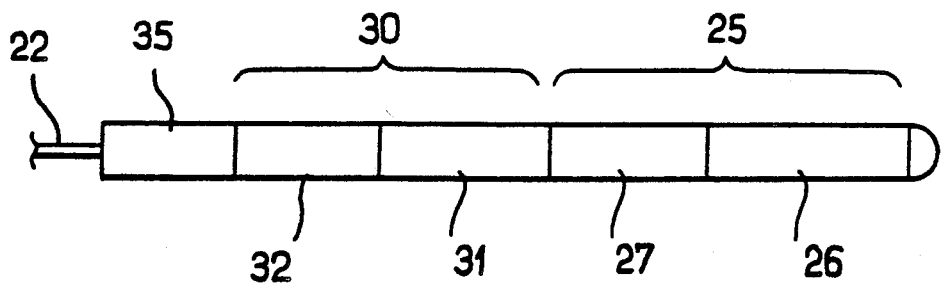
FIG_2

METHOD AND APPARATUS FOR DETERMINING THE DIRECTION TO A METAL-CASED WELL FROM ANOTHER WELL

BACKGROUND OF THE INVENTION

The present invention relates to a method and apparatus for locating a cased well from another well, and particularly for detecting and locating a blowing well from a relief well.

When a blowout occurs in a well, the conventional technique consists in shutting the well by using a relief well drilled from a point which is at a distance from the blowout zone. This technique requires the relief well to be drilled in the direction of the blowing well, which assumes that this direction can be determined from within the relief well.

Various methods have been proposed for locating a blowing well. A description of these techniques can be found in U.S. Pat. No. 4,372,398, column 1, line 55 to column 2, line 65 which description is incorporated herein by reference. The type of technique to which the invention pertains makes use of the presence of a metal casing in the blowing well, which casing therefore conducts electricity.

U.S. Pat. No. 4,072,200 describes a locating method consisting in exciting the casing of the target well with an alternating current so as to set up a magnetic field around the casing, and in detecting this field by means of a sensor placed in another well. That patent specifies that such a method is not applicable if the target well is on fire since it is then not possible to excite the casing of the target well.

The above-mentioned U.S. Pat. No. 4,372,398 describes a method of this type in which the electrical excitation is achieved by means of an electrode lowered down the relief well. The magnetic field set up around the casing in the target well is detected by means of sensors placed in the relief well at a distance from the electrode which is large enough to ensure that the currents flowing in and around the relief well do not disturb detection. However, this method suffers from short range limitations: it is hardly possible to detect a target well which is more than a few tens of meters away.

SUMMARY OF THE INVENTION

The object of the invention is to make it possible to detect the casing of a target well from a relief well at a substantially greater range than a few tens of meters.

There is provided according to the present invention a method of locating a target well lined with metal casing, comprising the steps of lowering an electrode and a magnetic field sensor into a relief well drilled towards the target well, injecting an alternating current into the ground by means of said electrode, and detecting by means of the sensor the magnetic field set up by the lines of current flowing between the electrode and the casing of the target well.

The direction of the detected magnetic field is dependent on the direction of the lines of current flowing towards the casing of the target well, which direction depends on the direction to the target well, as seen from the relief well.

Since the detection is performed on the magnetic field set up by the current leaving the electrode, it relates to a field which is induced in a region close to the relief well. As a result, detection can be performed from the relief well even if the target well is still too far away therefrom for the field induced about the casing in the target well to be detectable. Thus, detection indicative of the direction to the target well can be performed at a relatively great distance from the target well. The range at which detection can be performed varies as a function of the resistivity characteristics of the geological formations, but an order-of-magnitude figure of one hundred meters may be mentioned as practical.

The invention also provides an apparatus for implementing the above-defined method, the apparatus comprising means designed to be lowered into a relief well drilled towards a target well, said means comprising an electrode for injecting an alternating current into the ground and a magnetic field sensor, the distance between the sensor and the electrode being small enough for the major component of the magnetic field detected by the sensor to be set up by the electric current flowing in the ground from the electrode and towards the casing of the target well.

BRIEF DESCRIPTION OF THE DRAWINGS

The invention is described in greater detail below with reference to the accompanying drawing, in which:

FIG. 1 describes the locating method of the invention; and

FIG. 2 is a diagram of one embodiment of apparatus of the invention.

DESCRIPTION OF THE PREFERRED EMBODIMENT

FIG. 1 shows a blowing well 1 which is lined with metal casing 2. In order to stop the blowout, the well must be shut off at a desired depth from the surface, and to do this a relief well 5 must be drilled in such a manner as to intersect the blowing well at the desired depth. In order to be able to direct the drilling of the well 5 in appropriate manner, it is necessary to detect the blowing well from within the relief well.

The principle on which detection is based according to the invention is shown illustrated in FIG. 1. An alternating current is caused to flow between a downhole electrode 10 placed in the relief well and a return electrode 11 placed on the surface. The metal casing of wells (which is generally made of steel) has a much higher electrical conductivity than the geological formations, and constitutes a preferred path for the passage of current. As a result, the lines of current leaving the downhole electrode 10 tend to concentrate in the azimuthal direction of the casing of the blowing well, as shown diagrammatically in FIG. 1, and with respect to inclination relative to the vertical, the lines of current tend to travel perpendicularly to the casing 2, assuming that the geological formations between the wells are uniform from an electrical point of view. The flow of an alternating current, i, induces a varying magnetic field H in a plane perpendicular to the current flow, i.e. perpendicular to the plane containing the electrode 10 and the casing of the target well. This field is detected by means of an apparatus 15 lowered down the relief well, said apparatus comprising a magnetometer assembly sensitive to components of the magnetic field along three respective mutually orthogonal axes X, Y, and Z.

By measuring the three components of the alternating field H, it is possible to determine the plane in which the field is situated, and thus the direction towards the casing of the target well, which direction is perpendicular to the above-mentioned plane.

If the section of the relief well containing the electrode 10 and the detection apparatus 15 is pointing towards the target well, then the two wells lie in the same plane (at least over the sections under consideration). This causes the magnetic field detected by the apparatus 15 to be orthogonal to the axis of the relief well. In contrast, if the relief well is not pointing towards the target well, then the magnetic field detected in the relief well lies off the direction orthogonal to the axis of the target well. The trajectory along which the relief well is being drilled then needs to be corrected.

The apparaus 15 should be placed at a relatively small distance D from the downhole electrode 10 in order to be highly sensitive to the fields induced in regions close to the downhole electrode 10. It is appropriate for the distance D to be no greater that about 20 meters. A distance D greater than about 20 meters would make detection problematical. It is preferable for the distance D to be less than 10 meters. As for the excitation frequency, it is appropriate to make use of a frequency which is low, less than 10 Hz. The preferred value is 3 Hz. This frequency corresponds to a minimum in the spectrum of the Earth's magnetic field. It is also sufficiently high to ensure that electronic noise is low and measurement time is reasonably short.

In addition, it is necessary to know the direction in which the magnetometer assembly is pointing in a reference system tied to the Earth. To this end, the apparatus 15 includes, in association with the magnetometer assembly, a set of three magnetometers about the axes X, Y, and Z and sensitive to the Earth's magnetic field. It is also necessary to know the deviation of the relief well relative to the vertical at the depth under consideration. This can be obtained by means of accelerometers which are sensitive to components of the gravitational field along the axes X, Y, and Z and included in the apparatus 15, or else from information obtained while drilling the relief well.

In the implementation shown in FIG. 1, the apparatus 15 is connected to surface equipment housed in a laboratory truck 20 by means of an isolated conductor cable 21 and an isolated flexible connection 22, commonly referred to in the art as a "bridle", including a central conductor and provided over a limited region of its periphery with a conductor which is connected to the central conductor and which acts as the downhole electrode 10. Means are provided on the surface for producing alternating current at the above-specified frequency of 3 Hz. The truck 20 also includes the means required for acquiring the signals produced by the apparatus 15 and conveyed thereto by the cable 21, and means for processing said signals.

FIG. 2 shows a preferred embodiment of the measurement apparatus 15. The apparatus comprises a magnetometer assembly 25, an inclinometer assembly 30, and a telemetry cartridge 35 which provides an interface, in conventional manner, between the apparatus and the bridle 22 connected to the cable 21.

The magnetometer assembly 25 comprises a detection unit 26 and an electronic unit 27. The detection unit includes three magnetometers respectively sensitive to magnetic field components along three orthogonal axes X, Y, and Z at a given point. These magnetometers are preferably flux gate magnetometers. The electronic unit 27 essentially comprises operational amplifiers characterized by a passband which includes the excitation frequency, but which blocks D.C., in order to exclude the effect of the Earth's magenetic field. Using an excitation frequency fixed at 3 Hz, as mentioned above, the appropriate passband comprises the range 1 Hz to 10 Hz.

The operational amplifiers need to have gain. The gain may be about 1,000.

The inclinometer assembly 30 for specifying the orientation and the position of the apparatus 15 may be constituted by so-called GPIT sonde as used by Schlumberger. This apparatus comprises three magnetometers for measuring the three components X, Y, and Z of the Earth's magnetic field (unit 31) and three accelerometers (unit 32) sensitive to the components of the gravity field along the three axes X, Y, and Z. In conventional manner, a central passage (not shown) is provided through the inclinometer assembly in order to receive conductors connecting the magnetometer assembly 25 to the telemetry cartridge 35.

It will be observed that the detection unit 26 and the unit 31 may be made in identical manner. However, in the first case, the filtering performed in the unit 27 eliminates the Earth's magnetic field, so that its detection relates to the field induced by the above-mentioned electrical excitation, whereas for the unit 31, it is therefore the D.C. components which is detected.

What is claimed is;

1. A method of locating determining the direction to a target well lined with metal casing, comprising the steps of lowering an electrode and a magnetic field sensor into a relief well drilled towards the said target well, injecting an alternating current into the ground by means of said electrode, and detecting by means of said magnetic field sensor the magnetic field in the vicinity of said relief well and which is set up by the lines of current flowing between the said electrode and the casing of the target well.

2. A method according to claim 1, wherein the distance between the magnetic field sensor and the electrode is less than about 20 meters.

3. A method according to claim 1, wherein the frequency of the alternating current injected by the electrode is about 3 Hz.

4. A method according to claim 2, wherein the distance between the magnetic field sensor and the electrode is less than 10 meters.

5. A method according to claim 2, wherein the frequency of the alternating current injected by the electrode is about 3 Hz.

6. A method according to claim 4, wherein the frequency of the alternating current injected by the electrode is about 3 Hz.

7. Apparatus for locating determining the direction to a targer well lined with metal casing, the apparatus comprising means designed to be lowered into relief well drilled towards a target well, said means comprising an electrode for injecting an alternating current into the ground and a magnetic field sensor, the distance between the said sensor and the said electrode being small enough for the major component of the magnetic field in the vicinity of said relief well and which is detected by the said sensor to be set up by the electric current flowing in the ground from the said electrode and towards the casing of the said target well.

8. Apparatus according to claim 7, wherein the distance between the magnetic field sensor and the electrode is less than about 20 meters.

9. Apparatus according to claim 8, wherein the distance between the magnetic field sensor and the electrode is less than 10 meters.

10. Apparatus according to claim 7, wherein the frequency of the alternating current injected by the electrode is about 3 Hz.

11. A method for determining the direction to a target well lined with metal casing, comprising the steps of:

drilling, from the surface of the earth, well towards said target well;

exciting the casing of the target well with an alternating current generated in said relief well so as to set up a magnetic field in the vicinity of said casing, wherein said alternating current is set up by means of an electrode located near the bottom of said relief well and a return electrode at the surface of the earth, the frequency of said alternating current being about 3 Hz;

detecting said magnetic field from a location near the bottom of said relief well, said magnetic field being detected by a sensor located in said relief well and the distance between said sensor and said electrode being less than about 10 meters; and determining from said detected magnetic field the direction of said target well relative to the bottom of said relief well.

12. A method according to claim 11, further comprising the step of determining the spatial coordinates of the bottom of said relief well.

* * * * *